W. M. STEPHENS.
AX.
APPLICATION FILED JUNE 17, 1916.
1,265,276. Patented May 7, 1918.
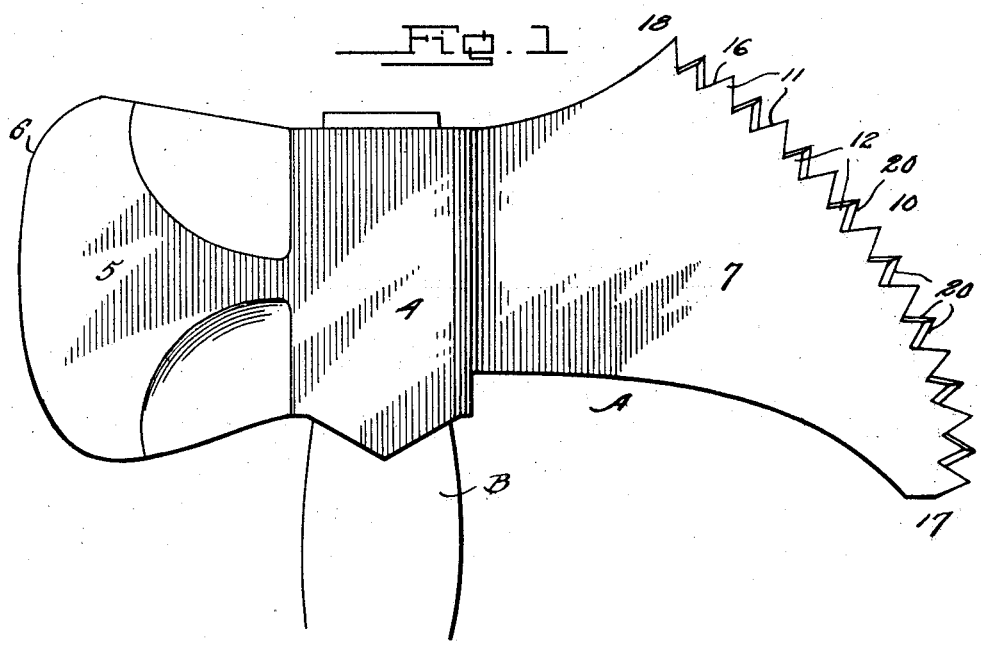
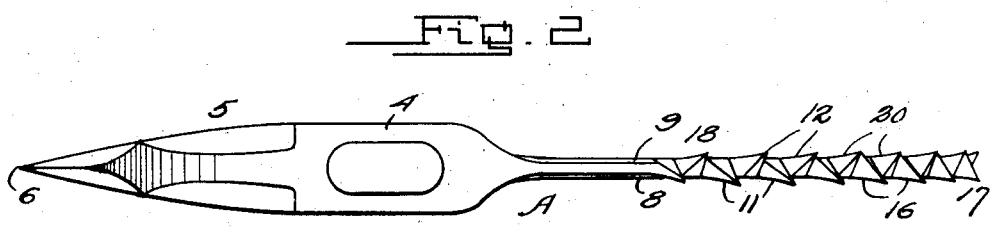
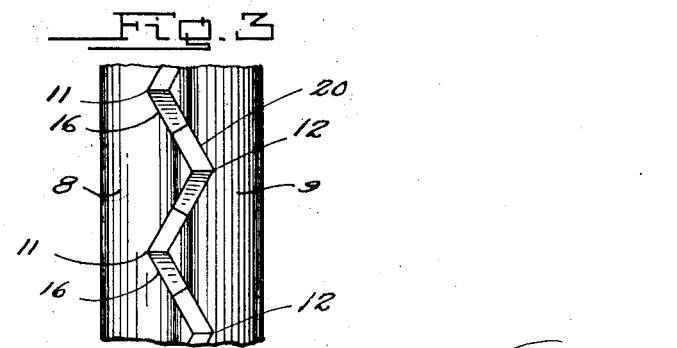
William M. Stephens, Inventor
By Lancaster and Allwine, His Attorneys

UNITED STATES PATENT OFFICE.

WILLIAM M. STEPHENS, OF EQUINUNK, PENNSYLVANIA.

AX.

1,265,276. Specification of Letters Patent. Patented May 7, 1918.

Application filed June 17, 1916. Serial No. 104,274.

*To all whom it may concern:*

Whereas, I, WILLIAM M. STEPHENS, a citizen of the United States, and resident of Equinunk, in the county of Wayne and State of Pennsylvania, have invented a certain new and useful Improvement in Axes, of which the following is a specification.

My present invention relates to an ax provided with a toothed work engaging portion, each tooth being wedge shaped and provided with lateral cutting edges.

The principal object of my invention is to provide an ax which is better adapted for cutting wood or fibrous material, and by which the user can more quickly and effectively break the fiber of the material by the blow.

Other objects of my invention are to provide a toothed ax, the teeth of which are of such a shape as to withstand the ordinary shocks to which a tool of this character is subjected; and, to so position the teeth on the ax head that their cutting edges are adapted to effectively serve in severing the fiber of wood or other material.

Other objects of the invention will appear in the following detailed description taken in connection with the accompanying drawings, forming a part of this specification, and in which drawings:

Figure 1 is a side elevation of an ax constructed according to my invention.

Fig. 2 is a top plan view of the same.

Fig. 3 is a fragmentary edge elevation of the ax, looking in the direction of the toothed work engaging portion.

In the drawings, where similar characters refer to similar parts throughout the several views, A designates an ax proper, and B the handle thereof.

In a practical application of my invention, the ax proper is made up of a main body portion 4, cutting extension 5, having the usual continuous cutting edge 6, and a relatively narrow extension 7, having faces 8 and 9, and a toothed work engaging portion 10.

Portion 10 is made up of a plurality of teeth 11, and 12, each of which is wedge shaped, and preferably disposed that each alternate tooth is offset with respect to one face of the ax, with cutting edges adjacent thereto, and the intermediate teeth offset with respect to the other face of the ax, with cutting edges adjacent thereto. For instance, as shown in the drawings, each tooth 11 is offset with respect to the face 8 of the ax, while the other teeth 12 are offset with respect to the face 9, providing lateral cutting edges 20, at or adjacent the face 9 of extension 7.

As clearly shown in Fig. 1 of the drawings, I prefer to form the toothed work engaging portion 10 arcuate, with the terminus 17 of said portion, toward the hand gripping portion of handle B, farthest away from the longitudinal axis of said handle, while the other terminus, that designated 18, is nearer the longitudinal axis of said handle. By this construction, the ax is well adapted for use in chopping through roofs where several plies of material are arranged quite frequently with the grain of the wood running crosswise.

It has already been proposed to provide ice tools, simulating an ax, and provided with a toothed work engaging portion, however, such tools are not practical for use in the severing of fibrous material, such as wood, the tools being too light, and the cutting edges of the teeth being in the same plane. It is to be observed from an inspection of Fig. 2 of the drawings, forming a part of this specification, that the ax is provided with teeth having lateral cutting edges adjacent both faces of the ax, and that they are so arranged that such cutting edges of one tooth are not in alinement with the cutting edges of the next adjacent teeth.

When using the ax, the operator transmits a blow to the work, by swinging the ax in such a manner that the cutting edges of the teeth engage the fiber, effectively severing them, the operator positioned a slightly greater distance from the work than when using the ax now in common use, so that the teeth are not driven into the wood at a right angle, but engage with the fiber with the cutting edges at an acute angle with respect to the surface thereof.

Changes in details may be made without departing from the spirit or scope of my invention; but,

I claim:

An ax comprising a head and a handle, said head provided with an arcuate toothed cutting portion, the one terminus of said cutting portion toward the hand gripping portion of said handle being farthest away from the longitudinal axis of said handle than the other terminus of said toothed cutting portion.

WILLIAM M. STEPHENS.

Copies of this patent may be obtained for five cents each, by addressing the "Commissioner of Patents, Washington, D. C."